United States Patent
Stone

[15] 3,704,626
[45] Dec. 5, 1972

[54] INTERFEROMETRIC METHOD AND APPARATUS FOR MEASURING GRAVITY GRADIENTS

[72] Inventor: Richard S. Stone, Lexington, Mass.

[73] Assignee: Arthur D. Little, Inc., Cambridge, Mass.

[22] Filed: Aug. 7, 1970

[21] Appl. No.: 62,008

Related U.S. Application Data

[63] Continuation-in-part of Ser. No. 25,153, April 2, 1970, abandoned.

[52] U.S. Cl. ................................73/382, 356/106 R
[51] Int. Cl. ..........................G01v 7/04, G01v 7/12
[58] Field of Search .........73/382; 356/106, 112, 130

[56] References Cited

UNITED STATES PATENTS 3,465,593   9/1969   Stevens et al............................73/382
3,500,688   3/1970   Hudson ..................................73/382
3,011,346   12/1961  Garvin....................................73/382
3,429,184   2/1969   Russell ..................................73/382

*Primary Examiner*—Jerry W. Myracle
*Assistant Examiner*—Herbert Goldstein
*Attorney*—Bessie A. Lepper

[57] ABSTRACT

Method and apparatus for measuring gravity gradients directly. Two retroreflectors are caused to experience free flight and the radiation reflected by those retroreflectors during this free flight is directed to a radiation receiver which senses and measures the temporal variations of intensity of the interfering reflected radiation beams. The rate of change in interference frequency over a number of consecutive time periods of equal duration is determined and the rate of change of this signal frequency is used as a direct measurement of a gravity gradient.

14 Claims, 5 Drawing Figures

INVENTOR.
RICHARD S. STONE
BY Bruce A. Lepper
Attorney

INVENTOR
RICHARD S. STONE
BY
Attorney

INTERFEROMETRIC METHOD AND APPARATUS FOR MEASURING GRAVITY GRADIENTS

This application is a continuation-in-part of my copending application, Ser. No. 25,153 filed Apr. 2, 1970 now abandoned.

This invention relates to method and apparatus for measuring gravity gradient and more particularly to method and apparatus which provide a direct and immediate measure of gravity gradients.

The determination of gravity gradients has long been known to be a very desirable way of sampling relatively large volumes of strata because of the simple dependence of the vertical gravity gradient on the density of the strata. As a example, the determination of gravity gradients may be widely used to detect the presence and to evaluate the extent of ore bodies and oil reserves beneath the surface of the earth. Presently, vertical gradients of gravity are obtained from measurements of gravity at various levels, such as by lowering a gravimeter down a borehole. (See for example "The U.S. Geological Survey — LaCoste and Romberg, Precise Borehole Gravimeter System — INstrumentation and Support Equipment" by T. H. McCulloh, L. J. B. LaCoste, J. E. Schoellhamer and E. H. Pampeyan in *Geological Survey and Research* 1967 and "The U. S. Geological Survey — LaCoste and Romberg, Precise Borehole Gravimeter System-Test Results" by T. H. McCulloh, J. E. Schoellhamer, E. H. Pampeyan and H. B. Parks in *Geological Survey Research* 1967.) These attempts, although encouraging, result in operations that are time-consuming and limited in resolution. Direct-reading gravity gradiometers have also been proposed. (See for example U.S. Pats. Nos. 2,618,156, 3,011,346, 3,095,744, 3,180,151 and 3,250,133.) However, the practical utility of such instruments is hindered by technical difficulties which are encountered in confined spaces such as boreholes.

Other borehole or well surveying methods and apparatus have been developed over the years in an attempt to overcome the difficulties encountered in the construction of a rugged, reliable and easily operated instrument capable of measuring density of surrounding strata. These alternate methods and apparatus have been based upon the measurements of the velocity of sound or the injection of γ-rays into a stratum and determination of the γ-rays which are returned. These types of measurements suffer from the fact that their effective range beyond the borehole into which it is placed is very limited. Typically, this effective radius is not more than a few inches. In contrast, a sensitive and reliable gravity gradiometer should have an effective radius of detection in the range of several feet.

The various possible uses for gravity gradiometer indicated the desirable characteristics one should possess. One use is in oil well logging in which the instrument is lowered into an existing well to determine the properties of the surrounding strata as a function of depth. Thus any gravity gradiometer used in a borehole to determine the gravity gradients along the entire depth of the hole must be very compact in size, have a minimum number of external connections, and be reliable and rugged.

Another use for a gravity gradiometer is in general surface prospecting in which gravity gradients are measured and blotted over a surface area, whether the area is land or water. On land, this may be done by stopping at predetermined points and making measurements. This same process may also, of course, be done on the water surface. However, this method of periodically stopping to determine gravity is a very expensive way of obtaining such measurements and often the terrain or sea conditions make such measurements hazardous or even impossible. This in turn has led to making gravity measurements over an area from an airplane or helicopter. Presently available instruments are, however, influenced by the motion of the airplane or helicopter and the "noise" resulting from such motion detracts from their useful sensitivity. Thus the use of a gravity gradiometer in general surface prospecting indicates that the instrument should be one which in its operation is essentially independent of vehicle motion.

It is therefore a primary object of this invention to provide an improved apparatus for directly measuring gravity gradients. It is another object to provide an apparatus of the character described which in its operation is essentially independent of its surroundings, is rugged and reliable and has a minimum number of external connections. An additional object of this invention is to provide a gravity gradiometer which is particularly suitable for operation in a borehole.

It is another primary object of this invention to provide a unique method of measuring gravity gradients directly. It is yet another object to provide a method of the character described which may be used in any desired environment, requires the minimum amount of operational skill and yet is reliable under many different conditions. Other objects of the invention will in part be obvious and will in part be apparent hereinafter.

The invention accordingly comprises the several steps and the relation of one or more of such steps with respect to each of the others, and the apparatus embodying features of construction, combinations of elements and arrangement of parts which are adapted to effect such steps, all as exemplified in the following detailed disclosure, and the scope of the invention will be indicated in the claims.

For a fuller understanding of the nature and objects of the invention, reference should be had to the following detailed description taken in connection with the accompanying drawings in which FIG. 1 is a somewhat diagrammatic longitudinal cross section of one embodiment of the apparatus of this invention in which the retroreflectors are launched into free flight by being propelled upwardly;

The gravity gradiometer of this invention employs two retroreflectors which are caused to experience free flight with vertical separation and relative velocity known at one point in time. Energy is furnished in the form of two distinct beams derived from a single source of substantially coherent, and preferably monochromatic, radiation, and it is transmitted to the two retroreflectors which are experiencing free flight for reflection to a receiver/detector in such a way as to bring about optical interference. The receiver/detector measures the temporal variations of resultant intensity of the interfering reflected radiation beams. This temporal variation of the output signal of the detector will be substantially as diagrammed in FIG. 4. The time rate of change of the frequency of this signal is directly related to the vertical gradient of gravity. In the absence of a gravity gradient, that is, if the gravity is everywhere constant, a constant signal frequency anywhere from zero to a few thousand Hertz will be obtained, depending upon the relative initial velocity of the retroreflectors. In the presence of a gravity gradient, one of the retroreflectors experiencing free flight will be accelerated more than the other and the relative velocity of the retroreflectors will change with time. The signal frequency, which is a measure of relative velocity, will change at a rate directly proportional to the difference in gravity at the two retroreflector locations, and since the retroreflector separation will be nearly constant the frequency of the signal will be directly related to the gravity gradient.

Gravity measuring devices have been disclosed which use a single falling body and interferometric techniques. (See for example "An Absolute Interferometric Determination of the Acceleration of Gravity" by James E. Faller, Palmer Physical Laboratory, Princeton University, Princeton, New Jersey, March, 1963 and U. S. Pat. No. 3,429,184.) However, these devices are not capable of measuring gravity gradients directly.

Figure 1:
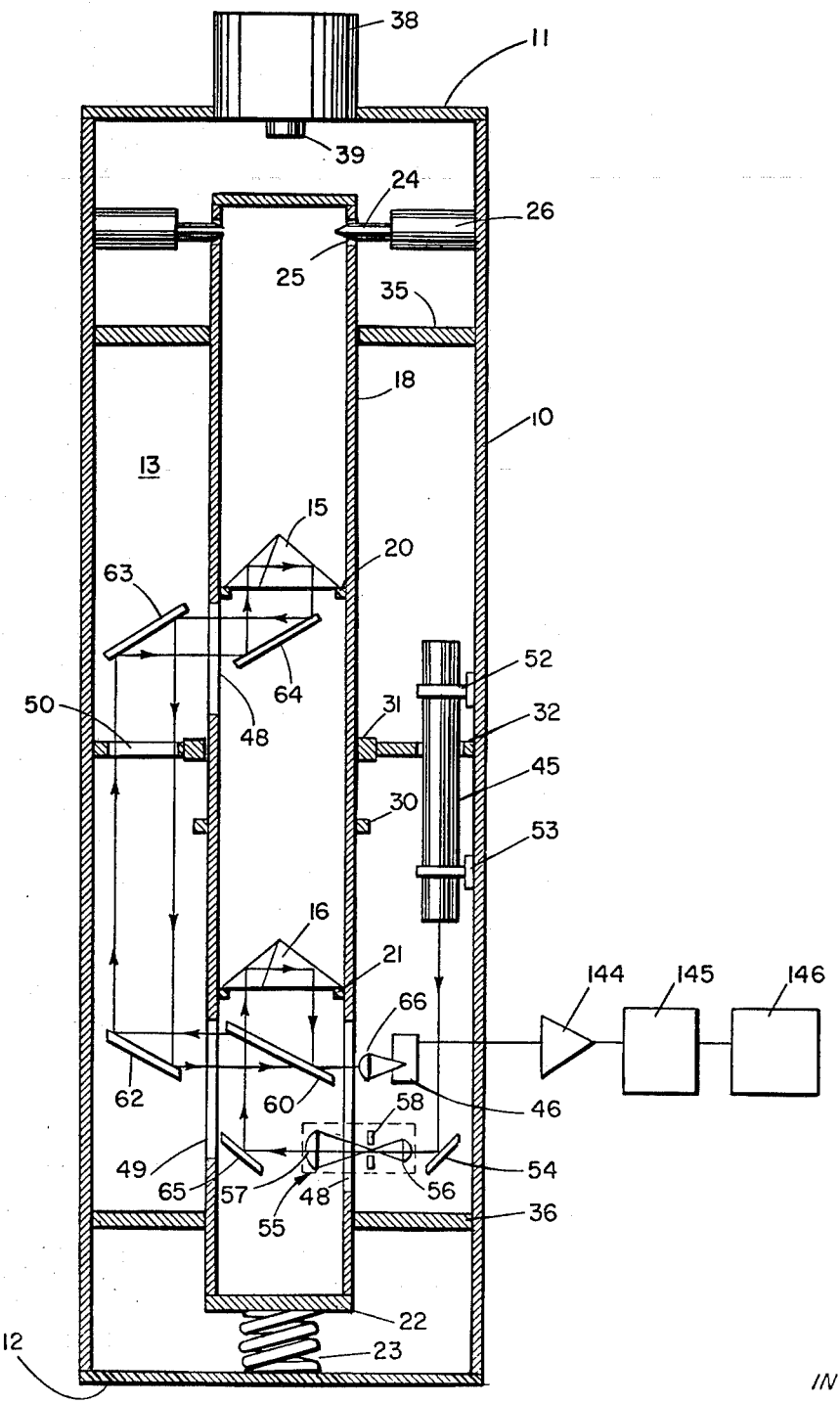

One embodiment of the apparatus of this invention is illustrated in FIG. 1. In this embodiment the two retroreflectors experience free flight two essentially equal distances which are defined between two distinctly different vertical levels, one being directly above the other. The retroreflectors are put into their free flight condition by being propelled upward to their upper vertical levels. The term retroreflectors is used hereinafter to designate any optical device that will provide a reflected ray parallel and traveling in the opposite direction to an incident ray independent of the angular orientation of the retroreflector.

In the embodiment of FIG. 1 the retroreflectors, and essentially all of the apparatus components, are located within a fluid-tight housing conveniently constructed as a cylindrical tubing 10 with a top member 11 and bottom member 12, one of which may be integral with the cylindrical section. The chamber volume 13 defined within the housing is evacuated to reduce the residual gas pressure with volume 13 so that it is low enough to substantially eliminate drag on the retroreflectors. The actual pressure used can readily be determined experimentally for any one set of conditions which include the use for the gravity gradiometer, the degree of accuracy desired, the configuration of the retroreflectors and the like. For many applications, pressures of about $10^{-4}$ torr should be sufficiently low. They may, of course, be lower.

Within chamber 13, the two retroreflectors 15 and 16 are supported with an accelerating carriage 18 on annular ring support 20 and 21, respectively. These supports are mounted on the internal wall of the accelerating carriage.

The optics of the apparatus are such as to require that the radiation beams reflected by the retroreflectors be parallel to the beams striking them. Hence the retroreflectors 15 and 16 must be configured to meet this optical requirement. In FIG. 1 the retroreflectors are shown to be corner cubes which may be solid or hollow, the solid ones being preferable from the point of view of ease of fabrication. The term "corner cube" is used hereinafter to mean a retroreflector which is a geometrical figure having three orthogonal plane surfaces. (See for example "Theory of the Corner-Cube Interferometer" by E. R. Peck, *Journal of the Optical Society of America;* 38; 1015 – 1024 (1948).) A number of other configurations are also known to serve as retroreflectors. For example, a convex lens held in a casing one focal length from a flat mirror, or a small, centrally positioned flat mirror held in a casing spaced one focal length from a concave mirror.

If the two retroreflectors are corner cubes, they may be hollow or solid. The center of gravity of a hollow or solid corner cube does not generally coincide with its optical center, and therefore rotation of the corner cubes during their free flights would produce spurious changes in the optical path unless corrective measures are taken. (See Craig and Rose, *Applied Optics*, 9: 974 (1970).). The corner cubes 15 and 16, or any other form of retroreflectors used, will therefore be incorporated in suitable assemblies which will be designed to be weighted in such a manner as to shift the center of gravity of the retroreflecting assemblies to coincide with the optical centers of the retroreflectors.

In the embodiment of FIG. 1 the retroreflectors 15 and 16 are put into a free-flight condition by being propelled upward within the accelerating carriage. This is accomplished by forcing the bottom 22 of the carriage against a spring 23 maintained in compression and then holding the accelerating carriage in this "loaded" position by means of two or more carriage actuating pins 24 which extend through apertures 25 in the upper end of the accelerating carriage. Pins 24 are adapted for axial movement within their associated carriage actuators 26, this axial movement being effected by a suitable device such as an electro-magnet located external of the housing. When the actuator pins 24 are withdrawn back into the carriage actuators, the carriage is freed and moved very rapidly upward by the action of spring 23. An annular ring 30 affixed to the outer wall of the accelerating carriage serves as a carriage stop which engages a fixed stop 31 which is mounted within the housing such as by means of an annular support member 32 which is appropriately apertured to permit radiation and equipment components to pass therethrough. The accelerating carriage is maintained in alignment by an upper carriage bearing 35 and lower carriage bearing 36. At the end of a measurement the accelerating carriage is returned to its "loaded" position by the carriage return actuator 38 which has a force-applying rod 39 movable along its axis. As the rod 39 forces the carriage downwardly the actuator pins 24, which may be spring-loaded, are moved to engage apertures 25 and hold the carriage in its "loaded" position preparatory to another measurement. With the engagement of pins 24, the force-applying rod 39 is withdrawn upwardly into the carriage return actuator 38.

The sudden movement of the carriage propels the two retroreflectors 15 and 16 upwardly to a maximum height which will be limited by the length of the carriage. The retroreflecters upon leaving their supports will be in condition to experience free flight. During this free flight, radiant energy beams from a source 45 of radiant energy strikes the retroreflectors and is reflected by them to a detector-preamplifier 46 in a manner to create an interference signal at the detector-preamplifier which lends itself to sensing and measurement by known interferometry techniques.

The radiant energy source 45 should be capable of providing substantially coherent radiation which is also preferably monochromatic. Exemplary of such a radiation source is a frequency-stabilized laser. In the embodiment of FIG. 1 the optical system requires that openings 48 and 49 provided in the carriage wall and that opening 50 be provided in the annular support member 32. This optical system comprises the laser source 45 mounted by rings 52 and 53 to the internal wall of the housing 10, a reflector 54 such as a mirror, a beam expander 55 shown to be formed of lenses 56 and 57 and aperture 58 and a beam splitter 60 which divides the radiant energy into two distinct beams for transmission to the two retroreflectors 15 and 16. That radiation beam transmitted to an reflected by retroreflector 15 is directed along the optical path which includes a series of reflecting means such as mirrors 62, 63 and 64. The radiation beam transmitted to retroreflector 16 is directed along the optical path which includes reflecting means such as mirror 65 and is reflected back to detector 46 by means of the beam splitter 60. Focusing means such as lens 66 are associated with detector 46.

It will be appreciated by one skilled in the art of optics that the optical components illustrated in FIG. 1 are only exemplary of one particular way in which the radiant energy is directed and reflected by the retroreflector back to the detector. If desired a major portion of the optical elements of the instrument may be located external of the evacuated chamber 13. The essential requirement for the optical system is that it must be capable of establishing interference between the reflected beams at the detector of the type illustrated in FIG. 4 and discussed below.

Figure 2:
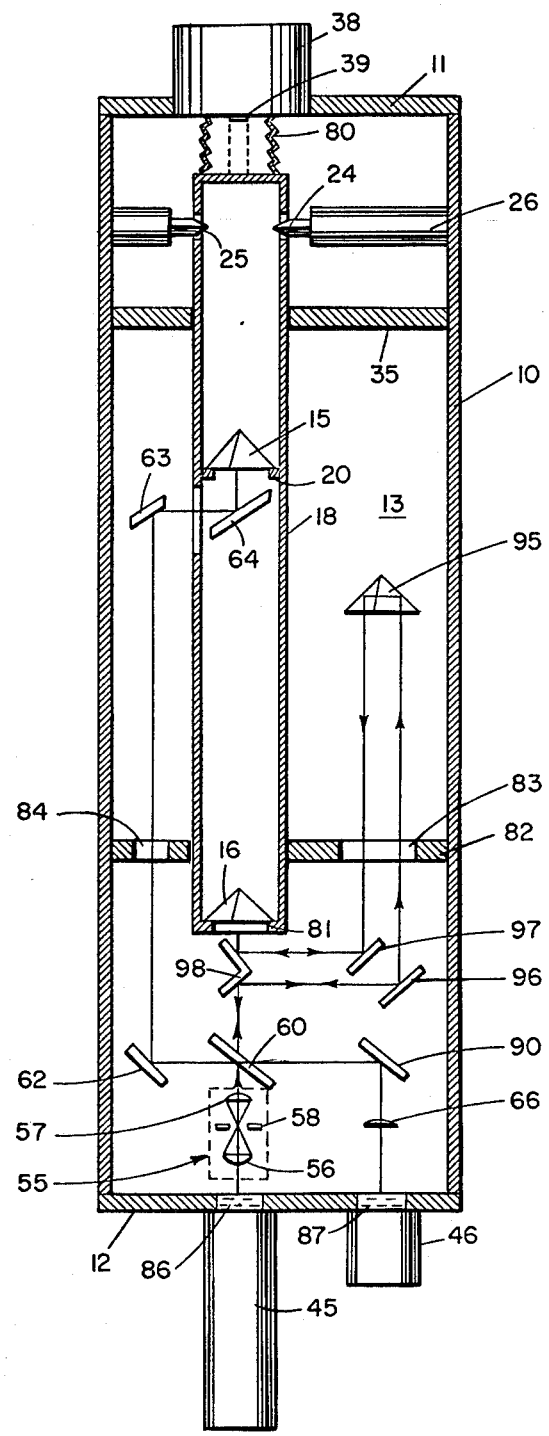
FIG. 2 is a somewhat diagrammatic longitudinal cross section of a modification of the apparatus of FIG. 1.

In the apparatus embodiment of FIG. 2 the two optical paths are of essentially equal lengths, the propelling mechanism is different from that of FIG. 1 and all major electrical components are located external of the vacuum chamber housing. In FIG. 2, like reference numerals are used to refer to like components in FIG. 1.

The propelling mechanism for the accelerating carriage 18 is a bellows 80 which forms a vacuum seal with the top of the carriage. In the "loaded" position the bellows are under tension and when the actuator pins 24 are withdrawn the bellows pull the carriage upward. The support for the lower retroreflector 16 is ring 81 serving as the bottom end of the carriage. The lower carriage bearing 82 has suitable apertures 83 and 84 for permitting the transmission of the two radiant energy beams.

In the apparatus of FIG. 2 the radiant energy source 45 and detector 46 are located externally of the evacuated chamber 13. These components are affixed to the bottom 12 of housing 10. Windows 86 and 87 which are transparent to the radiation used are sealed into the housing end 12. The optical path associated with the upper body 15 is essentially the same as that for the embodiment of FIG. 1. An additional mirror 90 (or other reflecting means) is required because of the position of the detector. In order to lengthen the optical path associated with retroreflector 16, a stationary corner cube 95 and three reflecting means, e.g., mirrors 96, 97 and 98 are used. Thus the radiant energy path to and from reflecting body 16 beyond beam splitter 60 comprises mirror 96, corner cube 95, mirror 97 and mirror 98. By making the two optical paths essentially equal in length it is possible to use a less sharply tuned laser than required in the apparatus of FIG. 1, and the problem of pulling by the returning beam associated with retroreflector 16 is negligible.

In the modifications of FIGS. 1 and 2 the two retroreflectors which undergo free flight are positioned one above the other, an arrangement which is desirable for borehole instrument or for any application wherein the attainment of small diameter sizes is a factor. A gravity gradiometer which is constructed in accordance with the principle of the gradiometer of this invention and which is particularly suitable for small-diameter instruments is described in a copending application Ser. No. 62,070 filed Aug. 7, 1970 in the name of Peter C. von Thuna and assigned to the same assignee as this application. In the gravity gradiometer of this referenced application the two retroreflectors experience free flight along a common vertical axis and the lower retroreflector is a solid corner cube incorporated in an optical element which serves both as a retroreflector and a beam splitter.

Figure 3:
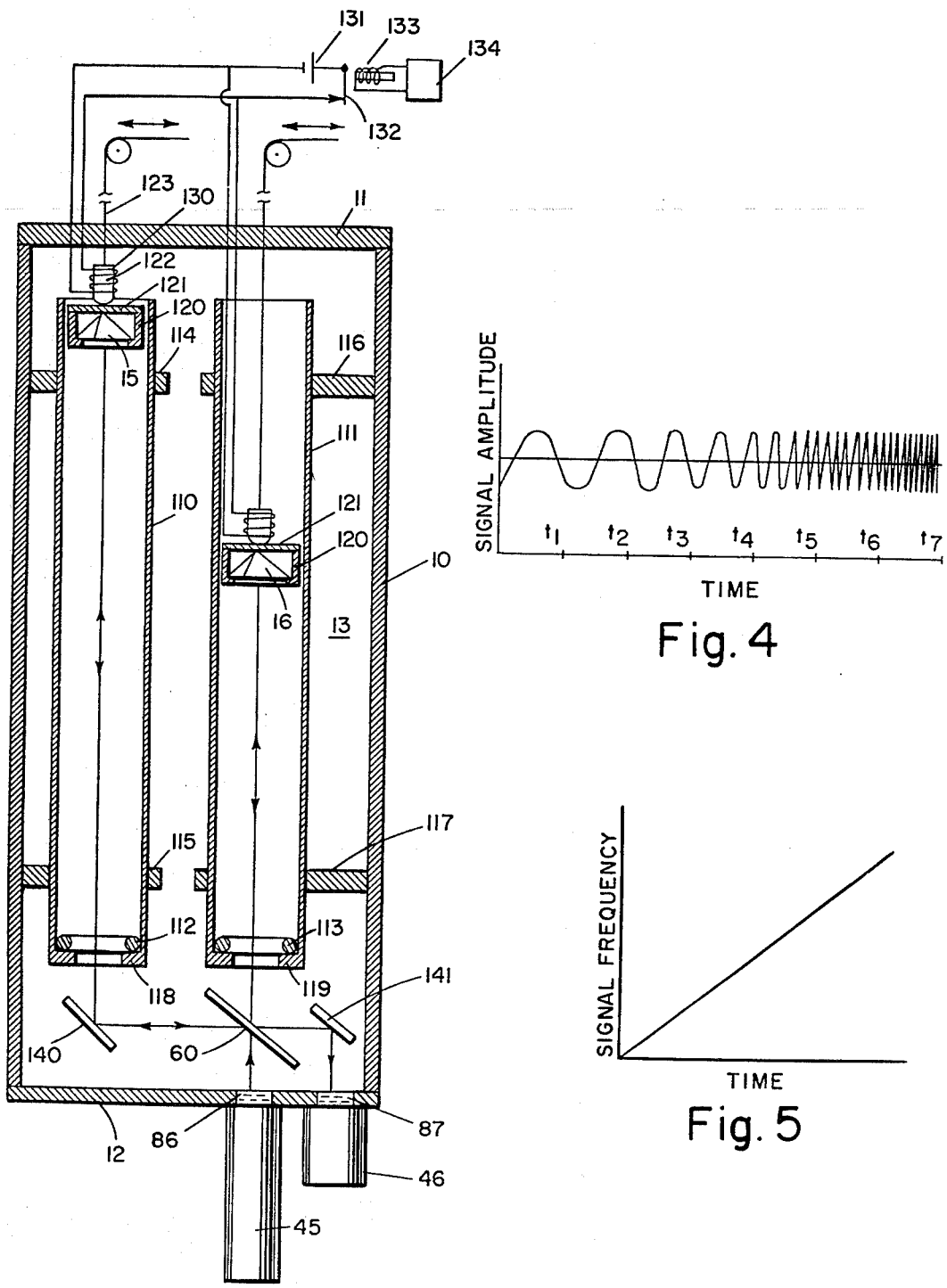
FIG. 3 is a somewhat diagrammatic longitudinal cross section of another embodiment of the apparatus of this invention in which the retroreflectors are launched into free flight by being released from a supporting system.

In the apparatus embodiment of FIG. 3, the retroreflectors are caused to experience free flight in parallel paths and, until the instant of their release, they are supported by magnets. Two modifications of this embodiment are possible. The first is that in which the retroreflectors are mounted at the same level and released for free fall at different times and the second is that in which the bodies are supported at different levels and are released simultaneously, the latter modification being specifically illustrated in FIG. 3.

In the apparatus of FIG. 3 like reference numerals are used to refer to like components in FIGS. 1 and 2 and the optics of the system are drawn in simplified form inasmuch as anyone skilled in the art can design a number of suitable optical systems to meet the requirements for the apparatus. Within the evacuated chamber 13 are positioned two free fall wells 110 and 111. These wells are conveniently thin tubular members; well 110 being affixed to the inner wall of housing 10 by upper support 114 and lower support 115 and well 111 by upper support 116 and lower support 117. The wells terminate in annular rings 118 and 119, these rings serving to stop the fall of the two retroreflectors 15 and 16. Padding rings 112 and 113 resting on rings 118 and 119, serve to cushion the impact of the retroreflectors. The retroreflectors are held in nonmagnetic rings 120 which are flanged inwardly on the bottom and to the top of which are attached a disk 121 of a magnetizable material such as steel. The retroreflectors are supported in the positions shown by a magnet core 122 which in turn is suspended from a wire 123 adapted to be raised and lowered by any suitable external means. Associated with each magnet core 122 is a coil 130 which is part of a circuit including a dc power source such as battery 131 and an electronically operated relay contact 132. The contact 132 in turn is controlled by a relay 133 and an electronic trigger circuit 134, all well-known electronic components.

It is normal condition, comparable to the "loaded" condition of the apparatus of FIGS. 1 and 2, the relay contact 132 of the apparatus of FIG. 3 is closed so that the electromagnet comprised of coils 130 and cores 122 will be energized and the magnetic force will be sufficient to hold the retroreflector assemblies in their uppermost positions as shown. When a signal is given by the electronic trigger circuit 134 to the relay 133, the relay contact 132 opens, the magnet is deenergized and the retroreflectors are released to experience free fall. After the measurement of gravity gradient has been made, relay contact 132 is closed and the magnetic cores and their associated coils are lowered by means of wires 123 to pick up the retroreflectors resting on padding rings 112 and 113. The entire assembly is then raised to the position shown in FIG. 3, to be ready for the next determination of gravity gradient.

As noted above, the optical elements in the apparatus of FIG. 3 are put in their simplest form and include a beam splitter 60 and mirrors 140 and 141. The use of a spatial filter, beam expander and the like are contemplated where necessary. Moreover, the auxiliary electronic equipment illustrated to be associated with the apparatus of FIG. 1 is also applicable to the apparatus embodiments of FIGS. 2 and 3.

An alternative method of operating the apparatus of FIG. 3 is possible. This involves the use of separate switch mechanisms and circuits for each of the magnetic cores and coils. The two retroreflectors are held at essentially the same level and then the operation of the two switches is controlled such that one coil is deenergized before the other. It is, of course, necessary that the timing of the switch actuation is such that the second retroreflector to be released begins its free flight while the first retroreflector is experiencing free flight.

In the operation of the apparatus shown, when the retroreflectors, e.g., corner cubes 15 and 16, begin their free flights, the radiation which reaches them form the laser 45, or other suitable source, is reflected back to the detector-preamplifier which sense radiation intensity, e.g., in the form of light intensity. Examples of a suitable detector are a solid state photodiode, (e.g., a silicon photodiode) and a photomultiplier tube. As shown in FIG. 1, the detector-preamplifier 46 is part of an electronic circuit which includes an amplifier 144, an electronic pulse counter and a suitable recording means 146 such as a digital recorder. All of these components are well-known and commercially available. Their use in conjunction with a detector is also well-known and it is well within the skill of the art to incorporate them in one or another type of circuit to obtain the information in a desired form.

Figure 4:
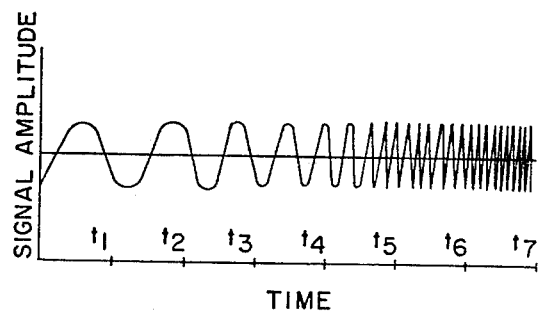
FIG. 4 is an exemplary plot, not to any scale, of Time versus Signal Amplitude determined by the detector.
Figure 5:
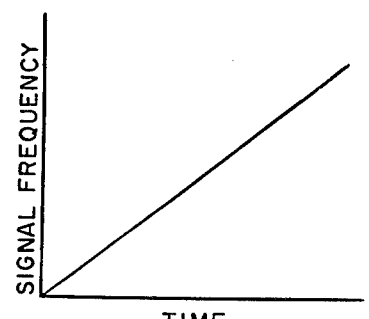
FIG. 5 is a plot of Time versus Interference Signal Frequency showing the direct measurement of gravity gradients.

As an example, the radiation intensity sensed by the detector may take the form of signals indicating the change of radiation intensity with time as shown in FIG. 4. As the retroreflectors experience free flight, the beams reflected from them are superimposed upon each other prior to striking the detector and a time-varying interference signal is obtained as shown in FIG. 4. If the gravity gradient is constant during the fall, then the difference in vertical velocities of the two retroreflectors is given by $$v(t) = v_o + [l_o t(dg/dz)]$$

where $v_o$ is the initial velocity difference, $l_o$ is the distance between the two bodies at time $t+o$, and $dg/dz$ is the vertical gradient of gravity. Further, the frequency, $f$, of the interference signal is given by $$f(t) = 2v(t)/\lambda$$

where $\lambda$ is the wavelength of the radiation. Thus if the electronic pulse counter 145 of FIG. 1 counts and records the number of pulses per predetermined time unit $t_1, t_2 \ldots t_n$ (or the signal frequency of FIG. 4), it is possible to plot signal frequency versus elapsed time as is done in FIG. 5. If the two retroreflectors in free flight experience a constant vertical gradient of gravity, then this plot will be a straight line. The slope of this line is a direct measure of the vertical gradient of gravity.

The time rate of change of signal frequency depends only upon changes in the relative vertical velocity of the two retroreflectors. Except for differences in initial horizontal easterly or westerly velocity of the two retroreflectors (which can be minimized by careful design or corrected by the apparatus and method described in a copending application, Ser. No. 62,110 filed Aug. 7, 1970 in the names of Richard S. Stone, Donald L. Sullivan and Peter C. von Thuna and assigned to the same assignee as this application) the relative vertical velocity of the two retroreflectors is unaffected by initial or subsequent motion of the instrument frame, energy source or detector. For this reason, the measurement of the vertical gradient of gravity is, with the exception noted, inherently insensitive to motion of the instrument frame, the energy source, the detector etc., or the vehicle in which the instrument may be mounted.

Apparatus constructed according to the embodiment of FIGS. 1 and 2 can be made in the form of a small-diameter cylinder and the external connections required are minimal. The amplifier, pulse counter and recorder in the detector circuit, the laser power supply, and the driving mechanisms for the actuating pins and force-applying rod may all be located at a point remote from the actual gravimeter and may be connected through a single cable if desired. The apparatus may be constructed in a rugged form thus making it particularly suitable for all types of prospecting and field applications.

It will thus be seen that the objects set forth above, among those made apparent from the preceding description, are efficiently attained and, since certain changes may be made in carrying out the above method and in the constructions set forth without departing from the scope of the invention, it is intended that all matter contained in the above description or shown in the accompanying drawings shall be interpreted as illustrative and not in a limiting sense.

I claim:

1. In an apparatus for determining the vertical gradient of gravity an optical assembly, comprising in combination
   a. first retroreflecting means;
   b. second retroreflecting means;
   c. first and second holding means adapted initially to retain said first and second retroreflecting means at predetermined vertical levels relative to each other;
   d. means to propel said retroreflecting means upwardly to release them from said holding means in a predetermined timed sequence thereby to cause said retroreflecting means to experience free flight;
   e. radiant energy source means;
   f. radiant energy receiving means adapted to generate signals proportional to radiant energy received; and
   g. optical means adapted to direct said radiant energy from said radiant energy source means along first and second paths to said radiant energy receiving means by way of said first and second retroreflecting means as they experience said free flight, said optical means including means to effect optical interference between the two beams of radiant energy reaching said radiant energy receiving means along said path.

2. An apparatus in accordance with claim 1 including means to receive said signals from said radiant energy receiving means to determine the temporal variations of intensity of the interfering reflected radiant energy beams as a measure of gravity gradient.

3. An apparatus in accordance with claim 1 wherein said first and second retroreflecting means are corner cubes.

4. An apparatus in accordance with claim 1 wherein said holding means are positioned to retain said first and second retroreflecting means at different vertical levels relative to each other and said means to propel said retroreflecting means upwardly are arranged to release said first and second retroreflecting means substantially simultaneously.

5. An apparatus in accordance with claim 1 wherein said holding means are positioned to retain said first and second retroreflecting means at essentially the same vertical level and said means to propel said retroreflecting means upwardly are arranged to release one of said retroreflecting means earlier than the other of said retroreflecting means.

6. An apparatus in accordance with claim 1 wherein said means to propel said retroreflecting means upwardly comprises an accelerating carriage wherein said retroreflecting means are supported and experience free flight and means to propel said carriage upwardly through a predetermined distance.

7. An apparatus in accordance with claim 1 wherein said means to propel said carriage comprises a spring in compression.

8. An apparatus in accordance with claim 1 wherein said means to propel said carriage comprises a bellows in tension.

9. An apparatus in accordance with claim 1 wherein said radiant energy source means is a frequency-stabilized laser.

10. An apparatus in accordance with claim 1 including housing means adapted to contain means defining an evacuated chamber enclosing said reflecting bodies, said holding means and said means to release said bodies.

11. A method of measuring gravity gradient directly, comprising the steps of
   a. holding first and second retroreflectors at predetermined vertical levels relative to each other;
   b. releasing said first and second retroreflectors by propelling them initially upwardly in a predetermined timed sequence thereby causing them to experience free flight in a vertical distance relationship to each other;
   c. directing radiant energy to said first and second retroreflectors during free flight;
   d. collecting the beams of radiant energy reflected by said retroreflectors in free flight to cause interference; and
   e. determining the temporal variations of intensity of the interfering reflected beams of radiant energy.

12. A method in accordance with claim 11 wherein said retroreflectors are held one above the other and experience free flight one above the other.

13. A method in accordance with claim 11 wherein said retroreflectors are held at the same level and experience free flight in parallel paths.

14. A method in accordance with claim 11 including the step of evacuating the space in which each of said retroreflectors is held and released whereby said retroreflectors experience their free flight in an atmosphere wherein drag on said retroreflectors is essentially eliminated.

* * * * *